(12) United States Patent
Yokoi et al.

(10) Patent No.: US 8,292,269 B2
(45) Date of Patent: Oct. 23, 2012

(54) MICROSCOPIC BUBBLE GENERATING APPARATUS

(75) Inventors: Yasuna Yokoi, Aichi (JP); Yoshinobu Ito, Mie (JP); Toshiaki Kato, Aichi (JP); Masafumi Takeda, Nagoya (JP); Kouiti Kume, Nagoya (JP); Hiroyuki Ito, Inabe (JP); Ikuhito Yokoi, Nagoya (JP)

(73) Assignee: Anlet Co., Ltd., Aichi (JP)

( * ) Notice: Subject to any disclaimer, the term of this patent is extended or adjusted under 35 U.S.C. 154(b) by 399 days.

(21) Appl. No.: 12/758,841

(22) Filed: Apr. 13, 2010

(65) Prior Publication Data
US 2010/0270690 A1   Oct. 28, 2010

(30) Foreign Application Priority Data

Apr. 24, 2009 (JP) ................................. 2009-106382
Aug. 17, 2009 (JP) ................................. 2009-188190

(51) Int. Cl.
*B01F 3/04* (2006.01)
(52) U.S. Cl. ............................. 261/29; 261/36.1; 261/92
(58) Field of Classification Search .................... 261/28, 261/29, 36.1, 90, 91, 92, DIG. 71
See application file for complete search history.

(56) References Cited

U.S. PATENT DOCUMENTS

| | | | | |
|---|---|---|---|---|
| 3,837,627 A | * | 9/1974 | Sence et al. ...................... | 261/29 |
| 4,211,733 A | * | 7/1980 | Chang ........................... | 261/36.1 |
| 4,290,979 A | * | 9/1981 | Sugiura ............................. | 261/4 |
| 5,356,533 A | * | 10/1994 | Nakagawa ..................... | 210/123 |
| 5,783,118 A | * | 7/1998 | Kolaini ............................. | 261/37 |
| 5,961,895 A | * | 10/1999 | Sanford ......................... | 261/36.1 |
| 7,360,755 B2 | * | 4/2008 | Hudson et al. .................. | 261/84 |
| 2009/0139771 A1 | * | 6/2009 | Smith et al. ...................... | 175/69 |

FOREIGN PATENT DOCUMENTS

| | | |
|---|---|---|
| EP | 1151786 A1 | 11/2001 |
| JP | 44-11345 | 5/1969 |
| JP | 53-015801 A | 2/1978 |
| JP | 54-37074 U | 3/1979 |
| JP | 57-187172 U | 11/1982 |

(Continued)

OTHER PUBLICATIONS

Office Action for Japanese Patent App. No. 2009-188190 (Aug. 26, 2011).

(Continued)

*Primary Examiner* — Charles Bushey
(74) *Attorney, Agent, or Firm* — Cermak Nakajima LLP; Tomoko Nakajima

(57) ABSTRACT

A microscopic bubble generating apparatus includes a Roots-type pump including a pair of multi-lobed Roots rotors housed in a pump casing, and a drive motor rotating the rotors, a suction pipe connected to a suction port of the pump casing, a discharge pipe connected to a discharge port of the pump casing, and a conduit communicating with the suction pipe and having an air inlet and a collision member with which sucked water is caused to collide. The pump is operated to suck water through the suction pipe and to cause the water mixed with air sucked through the air inlet to collide with the collision member so that a number of bubbles are generated. The bubbles are refined by a compressing action of the pump to be rendered microscopic. The water containing the microscopic bubbles is released from the discharge pipe into water in a septic tank or river.

4 Claims, 10 Drawing Sheets

FOREIGN PATENT DOCUMENTS

| | | |
|---|---|---|
| JP | 58-120660 A | 7/1983 |
| JP | 02-211232 A | 8/1990 |
| JP | 07-305689 A | 11/1995 |
| JP | 09-057083 A | 3/1997 |
| JP | 09-168792 A | 6/1997 |
| JP | 09-303299 A | 11/1997 |
| JP | 11-093878 A | 4/1999 |
| JP | 2000-153142 A | 6/2000 |
| JP | 2000-202261 A | 7/2000 |
| JP | 2001-276589 A | 10/2001 |
| JP | 2001-300276 A | 10/2001 |
| JP | 2003-135945 A | 5/2003 |
| JP | 2003-145179 A | 5/2003 |
| JP | 2003-260344 A | 9/2003 |
| JP | 2005-144352 A | 6/2005 |
| JP | 2005-245351 A | 9/2005 |
| JP | 2006-136777 A | 6/2006 |
| JP | 2007-007487 A | 1/2007 |
| JP | 2007-167830 A | 7/2007 |
| JP | 2008-012415 A | 1/2008 |
| JP | 3139460 U | 1/2008 |
| JP | 2008-126226 A | 6/2008 |
| WO | WO2008/029525 A1 | 3/2008 |

OTHER PUBLICATIONS

Office Action for Japanese Patent App. No. 2009-188190 (Jun. 7, 2011).

* cited by examiner

MICROSCOPIC BUBBLE GENERATING APPARATUS

CROSS-REFERENCE TO RELATED APPLICATIONS

This application is based upon and claims the benefit of priority from the prior Japanese Patent Application Nos. 2009-106382, filed on Apr. 24, 2009 and 2009-188190, filed on Aug. 17, 2009, the entire contents of both of which are incorporated herein by reference.

BACKGROUND

1. Technical Field

The present invention relates to a microscopic bubble generating apparatus which is used for aeration of a septic tank or blows microscopic bubbles into water of contaminated rivers, lakes, ponds and the like, thereby improving water quality.

2. Description of the Related Art

Aeration with the use of a blower is generally carried out for clarification of sewage water in a septic tank. For the purpose of aeration, air bubbles are blown out from a cylindrical plastic diffuser tube mounted at an exhaust side of the blower. However, the diffuser tube has a defect that the bubbles are swollen or contact with each other therein to burst, thereby disappearing.

In view of the aforementioned defect, Japanese Patent No. 3081983 discloses a microscopic bubble generating apparatus including two pumps having different discharge pressures. Discharge openings of the pumps are connected with each other by a piping. A supply pipe is connected to a suction port of the pump with higher discharge pressure in order to supply water together with air. A nozzle is provided on a suction port of the other pump with lower discharge pressure. Microscopic bubbles are generated from the nozzle by using the pressure difference during operation of both pumps. The disclosed microscopic bubble generating apparatus is provided with two water tanks, that is, a first water tank which stores water to be supplied to the pump with the higher discharge pressure and a second water tank storing water into which air bubbles are blown out. The apparatus is not constructed so that the water into which microscopic bubbles have been blown out is circulated between the pump and the second water tank. This results in a disadvantage that the extra water tank needs to be provided for storing water to be supplied to the higher discharge pressure pump.

SUMMARY

Therefore, an object of the present invention is to provide a microscopic bubble generating apparatus which can increase a dissolved oxygen level by blowing microscopic bubbles into water stored in the septic tank or the like, thereby improving the water quality.

The present invention provides a microscopic bubble generating apparatus which blows microscopic bubbles into water in a septic tank or river thereby to clean the water, the apparatus comprising a Roots-type pump including a pump casing provided with a suction port and a discharge port, a pair of multi-lobed Roots rotors housed in the pump casing, and a drive motor which rotates the rotors; a suction pipe connected to the suction port of the pump casing; a discharge pipe connected to the discharge port of the pump casing; and a conduit which communicates with the suction pipe and is provided with an air inlet and a collision member with which sucked water is caused to collide. The Roots-type pump is operated to suck water through the suction pipe and to cause the water mixed with air sucked through the air inlet to collide with the collision member so that a number of bubbles are generated. The bubbles are refined by a compressing action of the Roots-type pump thereby to be rendered microscopic. The water containing the microscopic bubbles is released from the discharge pipe into the water in the septic tank or the river.

In the above-described apparatus, the Roots-type pump is operated so that the water mixed with the air sucked through the air inlet by an ejector action is caused to collide with the collision member, whereby a number of bubbles are generated. And the bubbles are refined into microscopic bubbles by the compressing action of the Roots-type pump. The water containing the microscopic bubbles is discharged from the discharge pipe into the water in the septic tank or the river. A dissolved oxygen level can be increased since the microscopic bubbles remain in the water for a long period of time. Consequently, the water quality can be improved.

The two Roots-type pumps are disposed in series with each other when the bubbles are to be diffused into the water in a section of the river ranging from 100 to 200 meters, when the suction pipe at the suction side has a length ranging from 20 to 30 meters or when a suction lift of the Roots-type pump ranges from 3 to 5 meters. Consequently, the water can be cleaned stably.

The discharge pipe has a distal end provided with a nozzle with a check valve. The provision of the nozzle with the check valve can resolve an air pocket in which a part of the bubbles remain stagnant in the discharge pipe, and generation of microscopic bubbles can be enhanced. Furthermore, the nozzle with the check valve can prevent soil water in the septic tank, or the like from flowing into discharge pipe.

DETAILED DESCRIPTION OF THE EMBODIMENT

Figure 1:
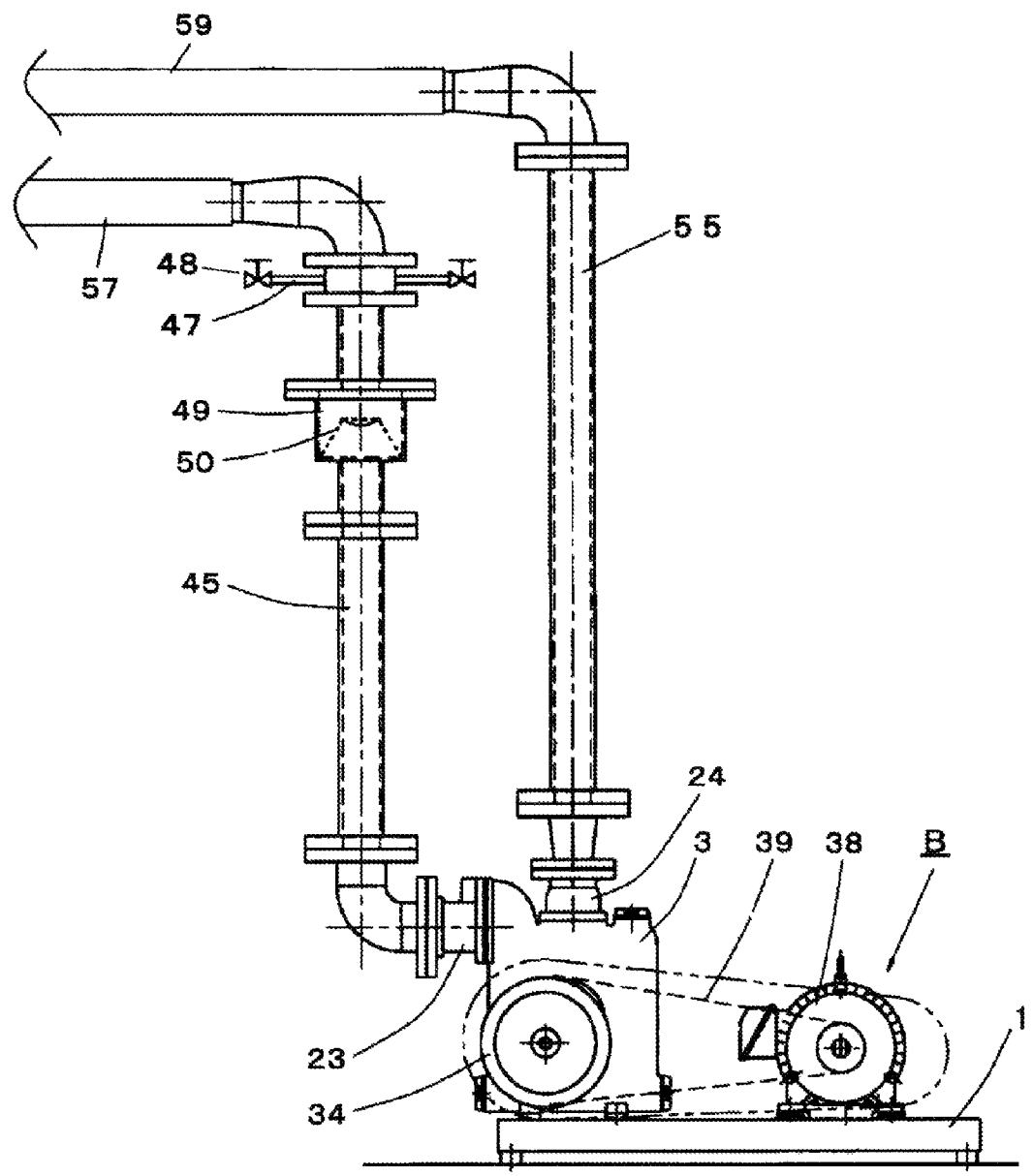
FIG. 1 is a diagram of the microscopic bubble generating apparatus in accordance with one embodiment.
Figure 2:
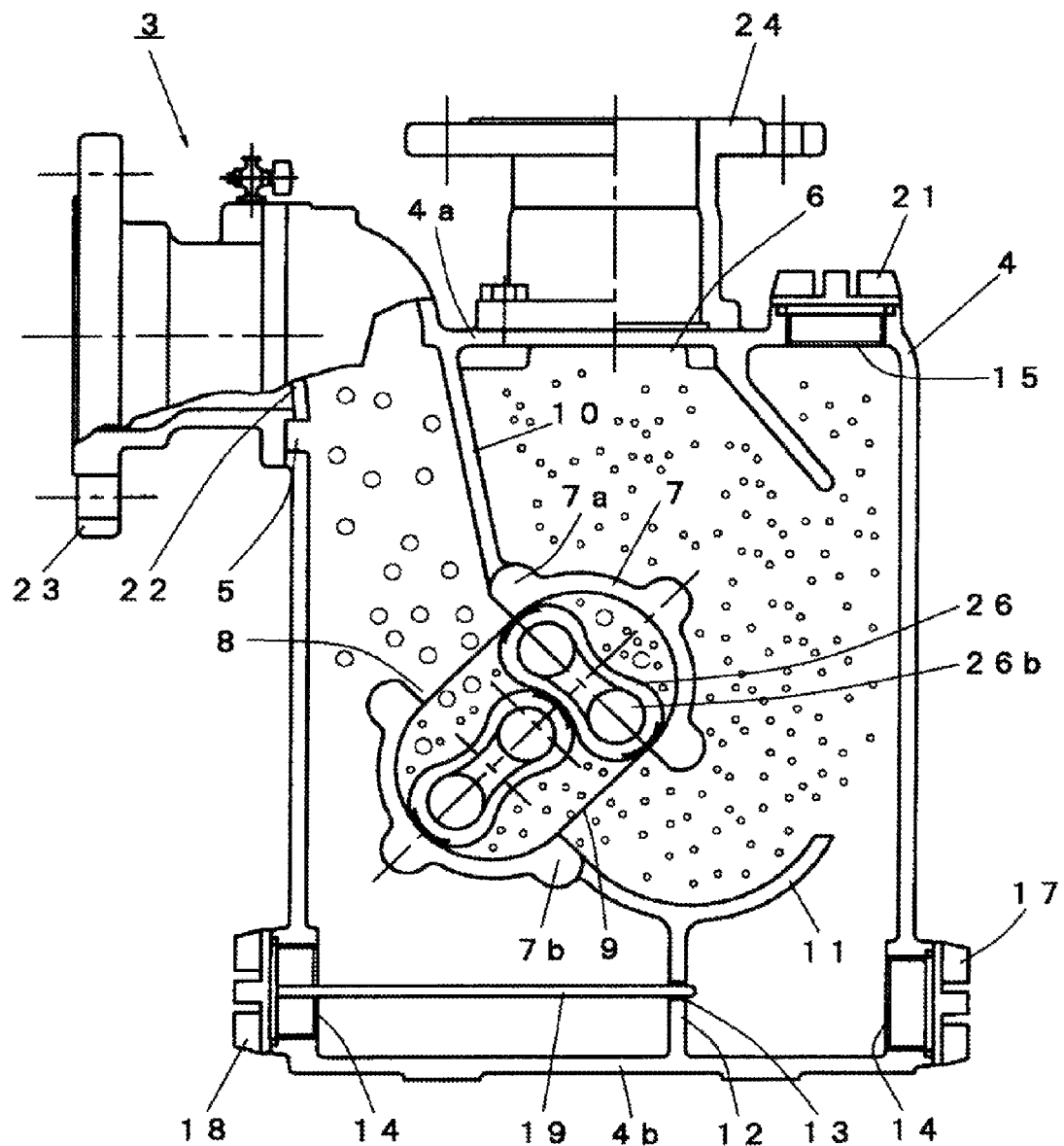
FIG. 2 is a longitudinal side section of a Roots-type pump provided in the apparatus.

One embodiment in accordance with the present invention will be described with reference to the accompanying drawings. A microscopic bubble generating apparatus B of the embodiment increases a dissolved oxygen level and improves water quality by blowing microscopic bubbles into water in a septic tank or river, and includes a Roots-type pump 3, a suction pipe 45 connected to a suction port 5 of the pump 3 and a discharge pipe 55 connected to a discharge port 6.

Referring to FIG. 1, the microscopic bubble generating apparatus B includes a base 1 on which the Roots-type pump 3 and an electric drive motor 38 are mounted. The Roots-type pump 3 includes a pump casing 4 formed with a suction port 5 and a discharge port 6 and a rotor casing 7 which is disposed in the pump casing 4 so as to be inclined 45 degrees. The rotor casing 7 has a suction port 8 provided in an obliquely upward part thereof and a discharge port 9 provided in an obliquely downward part thereof. A wall 10 connects between an upper corner 7a of the suction port 8 of the rotor casing 7 and a top 4a at the suction port 5 side of the pump casing 4. A recessed arc wall 11 is formed integrally with a lower corner 7b of the discharge port 9 so as to extend laterally from the lower corner 7b. A vertical wall 12 connects between a substantially middle part of the arc wall 11 and a bottom 4b of the pump casing 4. The vertical wall 12 is formed with a bypath hole 13.

The pump casing 4 has a peripheral wall formed with two drain holes 14 and a top 4a formed with a feed-water inlet 15. A cap 17 is threadingly engaged with one of the drain holes 14, and a cap 21 is threadingly engaged with the feed-water inlet 15. A cap 18 is threadingly engaged with the other drain hole 14 and has a rod 19 protruding from a central part thereof. The rod 19 has a distal end inserted into the bypath hole 13. A check valve 22 and a flanged fitting 23 for a piping purpose are in turn attached to the suction port 5. A flanged fitting 24 is also attached to the discharge port 6.

Figure 3:
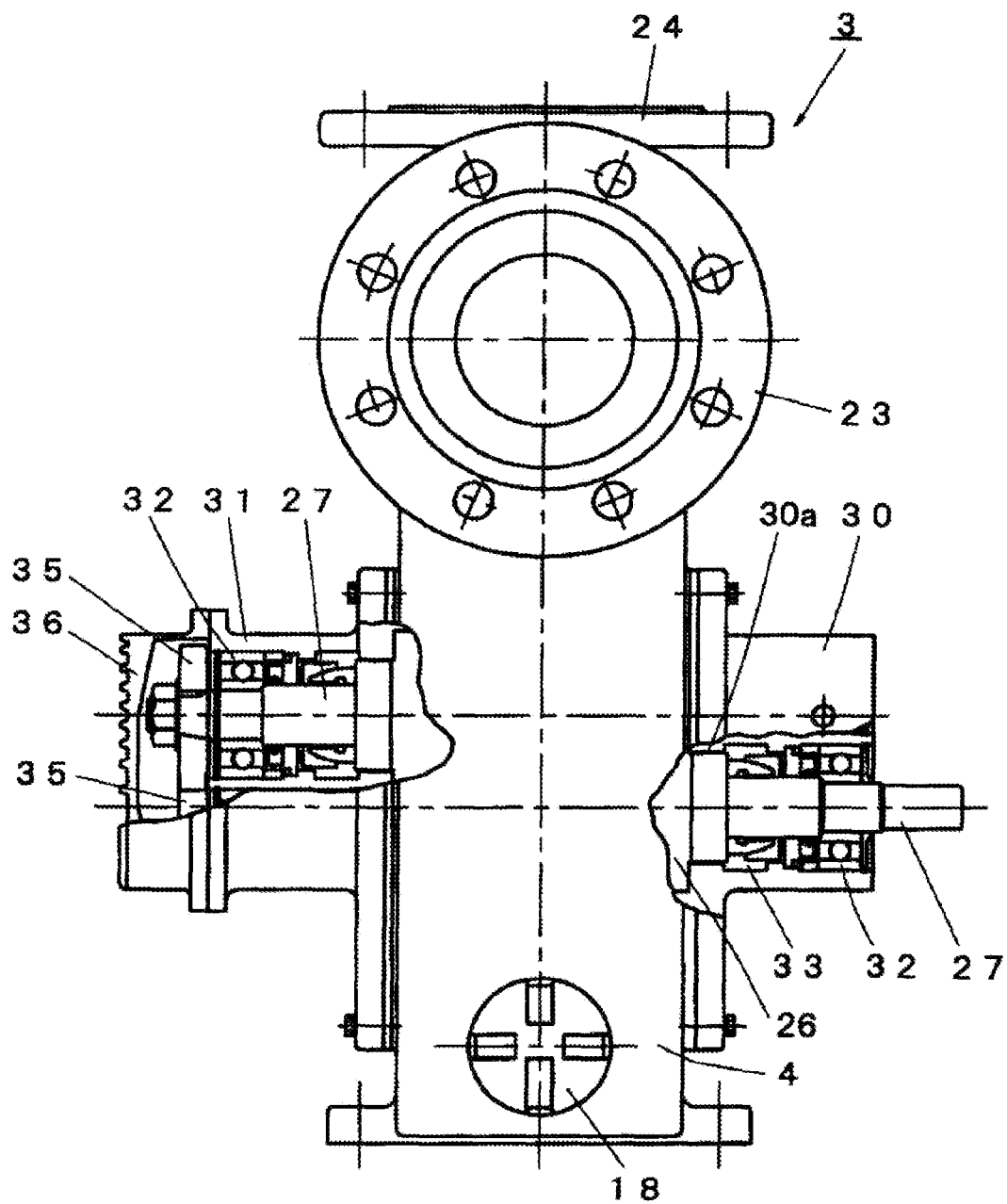
FIG. 3 is a partially broken front view of the Roots-type pump.

A pair of two-lobed Roots rotors 26 are accommodated in the rotor casing 7. The pump casing 4 has opposite sides to which housings 30 and 31 are fixed respectively. The Roots rotors 26 have rotor shafts 27 which are rotatably supported on bearings 32 mounted on the housings 30 and 31 respectively, as shown in FIG. 3. The lower rotor shaft 27 has one of two ends which protrudes out of the housing 30 and on which a pulley 34 is mounted as shown in FIG. 1. The pulley 34 is rotated via a transmission belt 39 by a drive motor 38. The upper rotor shaft 27 has one of two ends to which two timing gears 35 are fixed. The timing gears are adapted to be brought into mesh engagement with each other. A gear cover 36 is mounted on an opening of the housing 31.

Each housing 30, 31 is provided with a stuffing box 33 located in the rear of the bearing 32 supporting the rotor shaft 27 therein. A known mechanical seal (not shown) is accommodated in each stuffing box 33. A polyurethane-rubber or nitrile-rubber lining is applied to an outer side of cored bar of each Roots rotor 26 except for the rotor shaft 27. Although the Roots-type pump 3 employs the two-lobed Roots rotors 26 in the foregoing embodiment, three-lobed Roots rotors 41 may be employed in the Roots-type pump, instead, as shown as another embodiment in FIG. 4.

Figure 4:
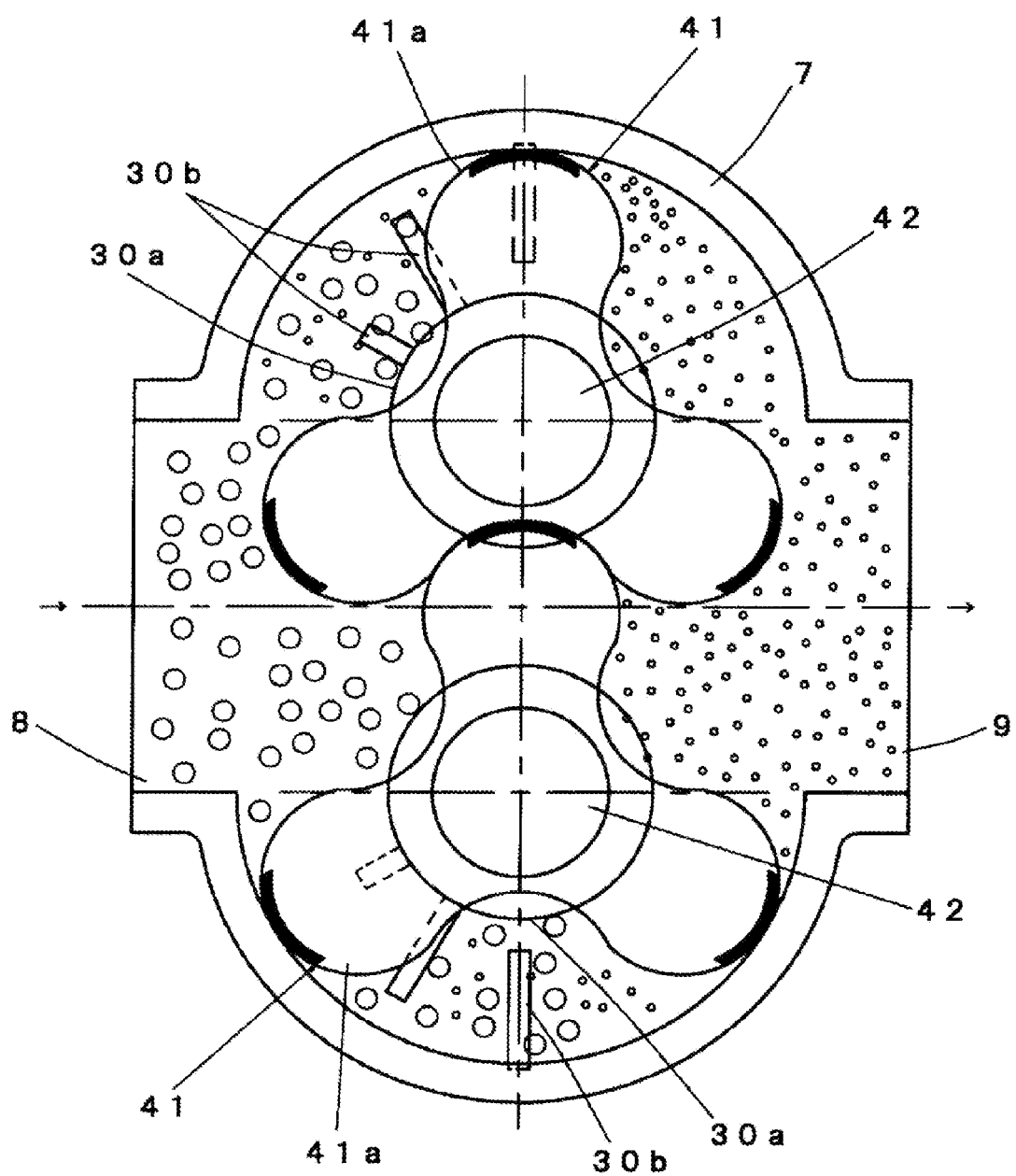
FIG. 4 is a partial schematic diagram of a three-lobed Roots-type pump.

FIG. 4 shows generation of microscopic bubbles by the three-lobed Roots rotors 41. In the embodiment, a part of the inner surface of the housing 30 corresponding to the suction side is formed with a plurality of or for example, three shearing grooves 30b which radially extend around a shaft hole 30a into which a rotor shaft 42 is inserted. Each shearing groove 30b has a width ranging from 5 to 15 mm, a length ranging from 15 to 25 mm and a depth ranging from 5 to 10 mm Regarding the lengths of the shearing grooves 30b, the first shearing groove 30b may extend from a shaft hole edge to an intermediate position of inner diameter of the rotor casing 7. The second shearing groove 30b may extend from the shaft hole edge to a three-fourth position of the inner diameter of the rotor casing 7. The third shearing groove 30b may extend from near the shaft hole edge to a position slightly outside the inner diameter of the rotor casing 7. Thus, the lengths of the shearing grooves 30b may be varied according to a rotational direction of the Roots rotor 41. The other housing 31 is also provided with the same shearing grooves. Sundries sometimes flow into the rotor casing 7, entering into the shearing grooves 30b. The sundries are then sheared by a shearing action of the side edges of the lobes 41a of the Roots rotor 41 and angled edges of the shearing grooves 30b.

Figure 5:
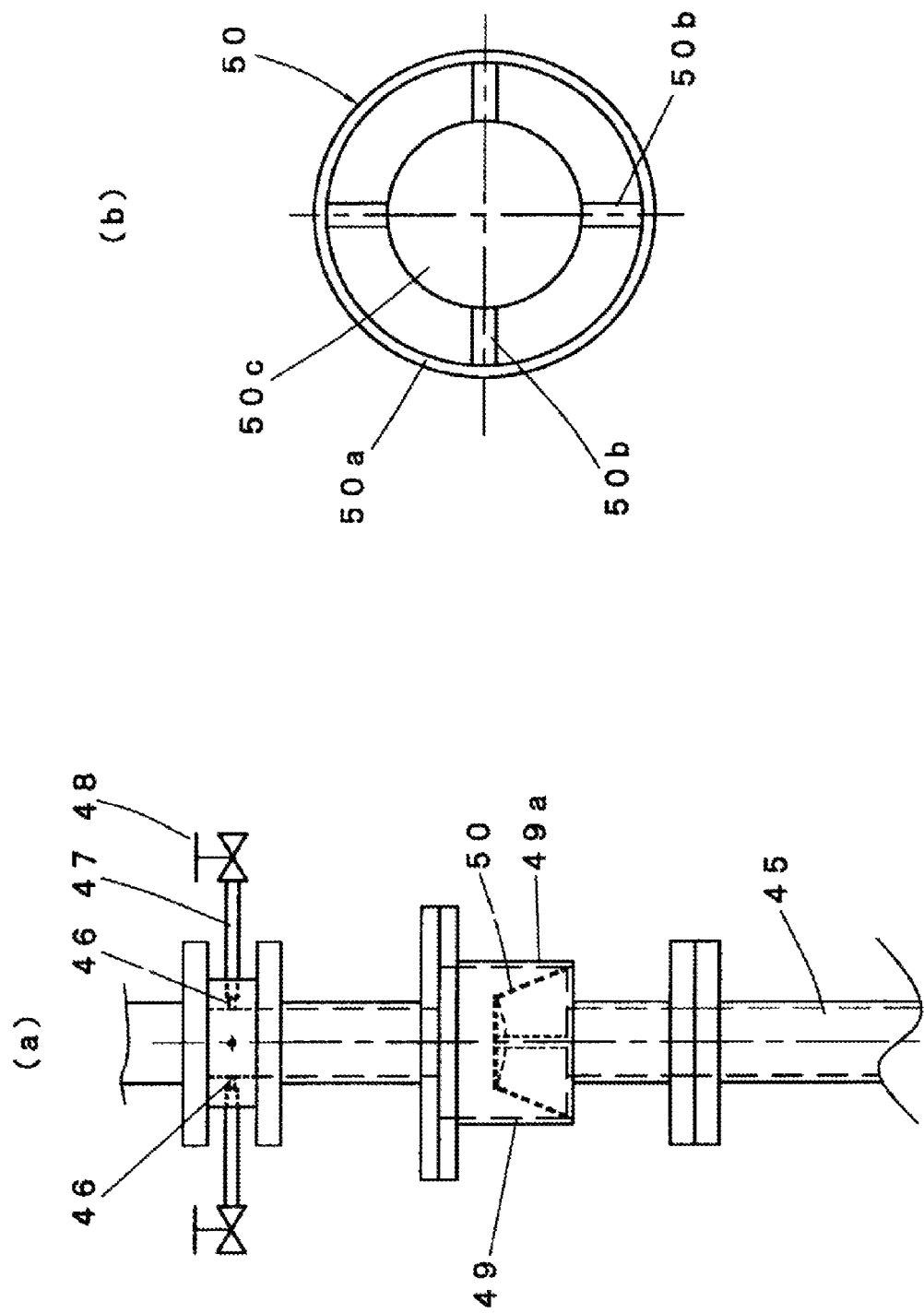
FIGS. 5A and 5B are diagrams of a bubble generating pipe.

A conduit communicating with a suction pipe 45 connected to the Roots-type pump 3 is provided with a plurality of air inlets 46. An on-off valve 48 is mounted to a conduit connected to one of the air inlets 46. A bubble generating pipe 49 is provided on a part of the conduit located nearer to the suction port 5 of the Roots-type pump 3 than the air inlets 46 as shown in FIGS. 5A and 5B. The bubble generating pipe 49 includes a larger-diameter portion in which is incorporated a collision member 50 for generating air bubbles. The collision member 50 includes four legs 50b extending upward from a ring 50a placed on the bottom of the larger-diameter portion 49a. The legs 50b have respective upper ends to which a circular plate 50c is fixed.

Figure 6:
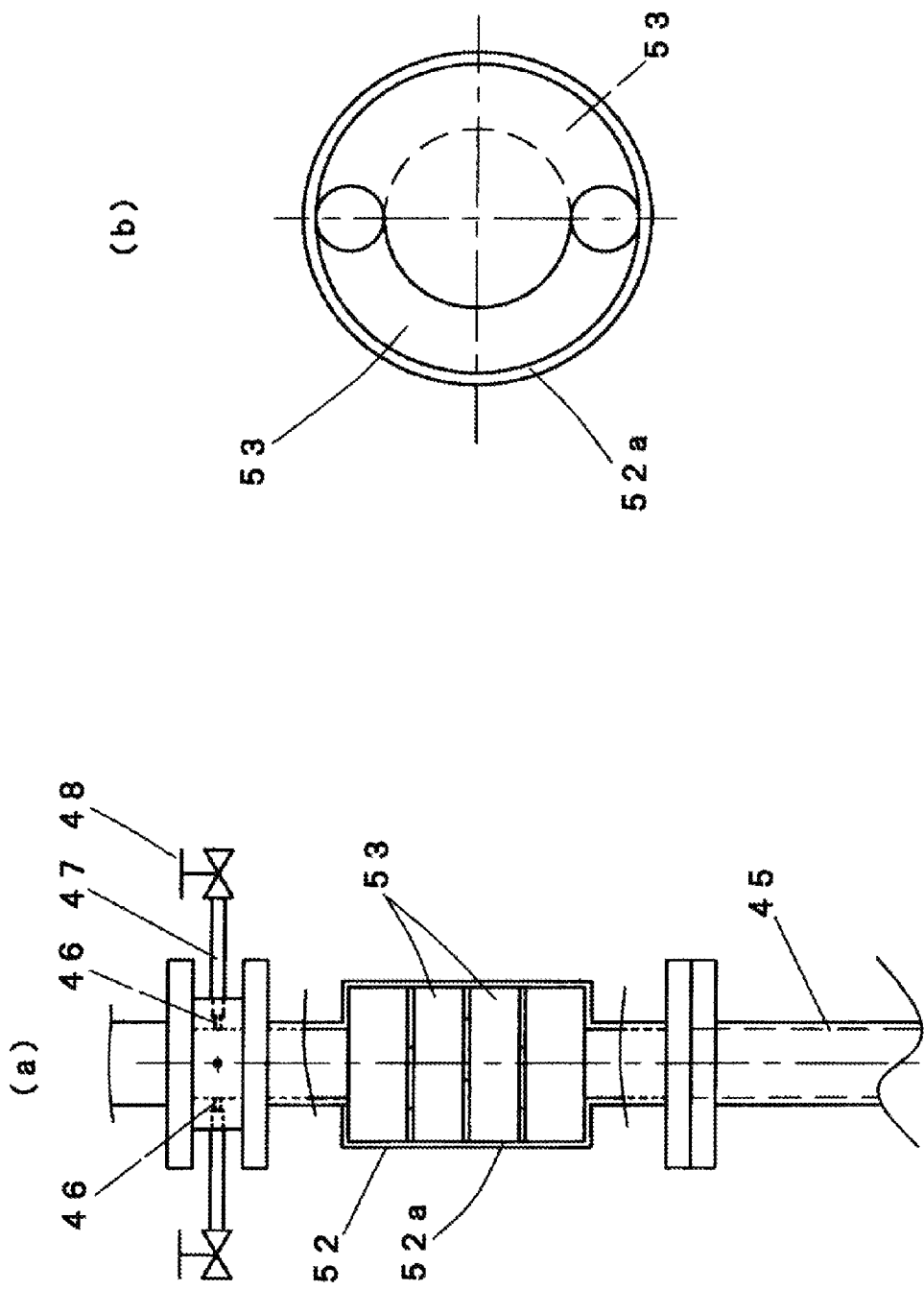
FIGS. 6A and 6B are diagrams of another bubble generating pipe.

FIGS. 6A and 6B show a collision member 53 as another form of the collision member 50. The collision member 53 has a predetermined thickness and is formed into a semicircular shape. Two collision members 53 are alternately stacked in the larger-diameter portion 52a of the bubble generating pipe 52. The bubble generating pipe 52 is suitable for use in the case where sucked water contains a large amount of dust.

Upon operation of the Roots-type pump 3, water is sucked from the suction pipe 45 and mixed with air taken in from the air inlets 46 by the ejector action. The water mixed with the air is caused to collide with the collision member 50 so that a large number of bubbles are generated, and the bubbles are refined by a compressing action into microscopic bubbles. The water containing the microscopic bubbles is released from a discharge conduit 55 into the water in the septic tank or the river.

Figure 7:
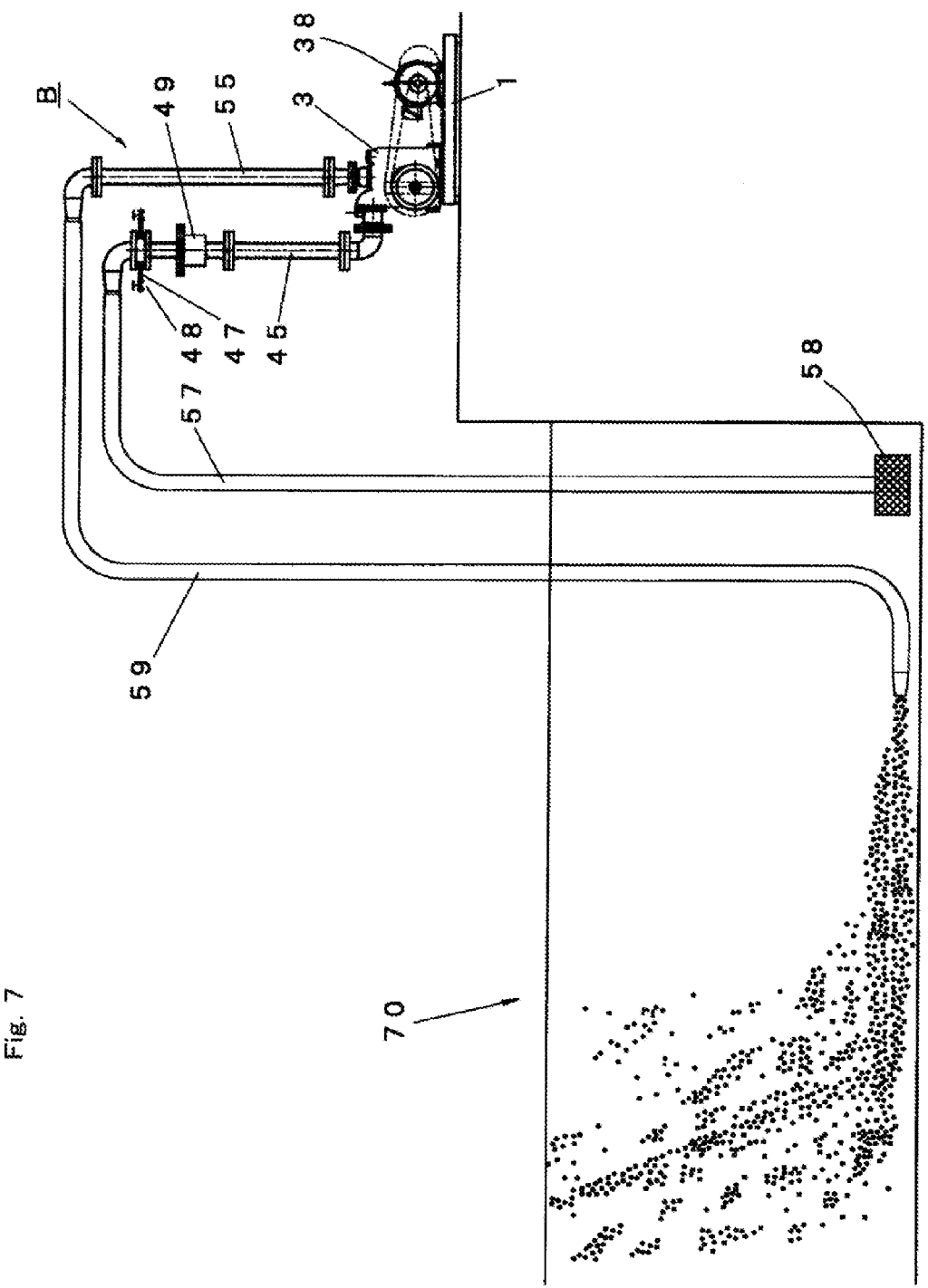
FIG. 7 is a diagram of the microscopic bubble generating apparatus installed for aeration of a septic tank.

FIG. 7 shows a septic tank 70 installed with the microscopic bubble generating apparatus B. A suction pipe 57 extending near the bottom of the septic tank 70 is connected to the suction pipe 45. A filter 58 is attached to a distal end of the suction pipe 57. A release pipe 59 is connected to the discharge conduit 55 to return soil water into the septic tank 70.

According to the foregoing microscopic bubble generating apparatus B, the drive motor 38 is driven to rotate the two-lobed Roots rotors 26 of the Roots-type pump 3 so that soil water in the septic tank 70 is sucked through the filter 58 into the suction pipe 57. The sucked water is mixed with air taken in from the air inlets 46 by the ejector action. The water mixed with the air is caused to collide with the collision member 50 so that a large number of bubbles are generated, and the bubbles are refined by a compressing action into microscopic bubbles. The water containing the microscopic bubbles is released from a discharge conduit 55 through the release pipe 59 into the septic tank 70. The above-described operation of the apparatus B is continued for a predetermined period of time. As a result, a dissolved oxygen level of the soil water can be improved and accordingly the water quality can be improved.

In a modified from, two Roots-type pumps are arranged in series when bubbles are diffused into the water in a section of the river ranging from 100 to 200 meters long, when the suction pipe at the suction side has a length ranging from 20 to 30 meters or a suction lift of the Roots-type pump ranges from 3 to 5 meters high.

In another modified from, the discharge pipe 59 has a distal end provided with a nozzle 65 with a check valve in order that an air pocket resulting from a part of the bubbles retarded in the release pipe 59 may be resolved and so that generation of microscopic bubbles may be enhanced.

The aforementioned nozzle 65 with the check valve includes a valve hole 66b provided in a wall 66a formed substantially in the middle inside of a cylindrical nozzle body 66. A spherical valve 67 made of rubber is inserted in a valve chest 66d communicating with the valve hole 66b, so as to be freely movable. The spherical valve 67 is allowed to abut a stopper 66e so as to be prevented from falling out of the valve chest 66d. The valve hole 66b is formed with a valve seat 66c. The nozzle body 66 has a rear end formed with a mounting portion 66f with a smaller diameter. The mounting portion 66f is inserted into a distal end of the release pipe 59 to be fixed. The size of the valve hole 66b is set so that the pressure of discharged water is maintained in the range from 0.3 to 0.5 kP.

Water containing microscopic bubbles is supplied from the Roots-type pump 3 through the discharge pipe 55 and the release pipe 59 to the nozzle 65 with the check valve. The flow rate of the water is increased when the water passes through the valve hole 66b. The water with the increased flow rate collides with the spherical valve 67 freely moving in the valve chest 66d, whereby the bubbles are again rendered microscopic thereby to rush into the water.

Furthermore, the nozzle 65 with the check valve prevents soil water in the septic tank or the like from flowing into the release pie 59 by a back-flow preventing action thereof during shutdown of the Roots-type pump 3.

Experiment 1

Figure 8:
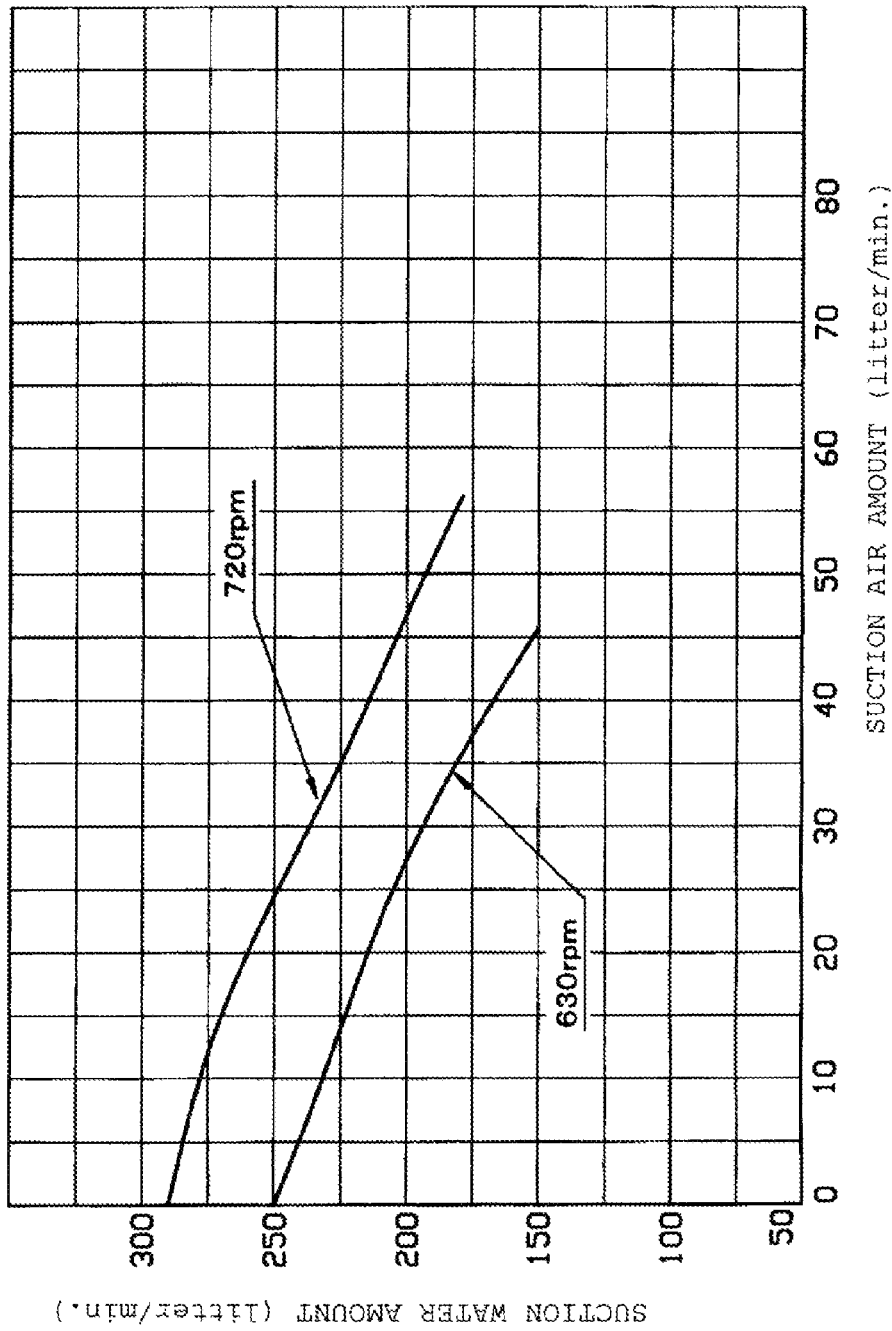
FIG. 8 is a graph showing characteristics of the Roots-type pump used in the apparatus.

An experiment was conducted with respect to the Roots-type pump of the microscopic bubble generating apparatus B. A ratio of an amount of water suction to an amount of air suction was measured under the following conditions with the use of clear water in the experiment. FIG. 8 shows the results of the experiment.

Experimental Conditions:
Diameter of Roots-type pump: 50 mm
Rotational speed: 630 to 720 rpm
Motor output power: 1.5 Kw
Suction pressure: −50 kPa
Discharge pressure: 10 kPa The experiment confirmed that the ratio of a suction water amount to a suction air amount ranged from 10 to 30% (maximum) and that a large amount of air was mixed in the clear water by the ejector action.

Experiment 2

Figure 9:
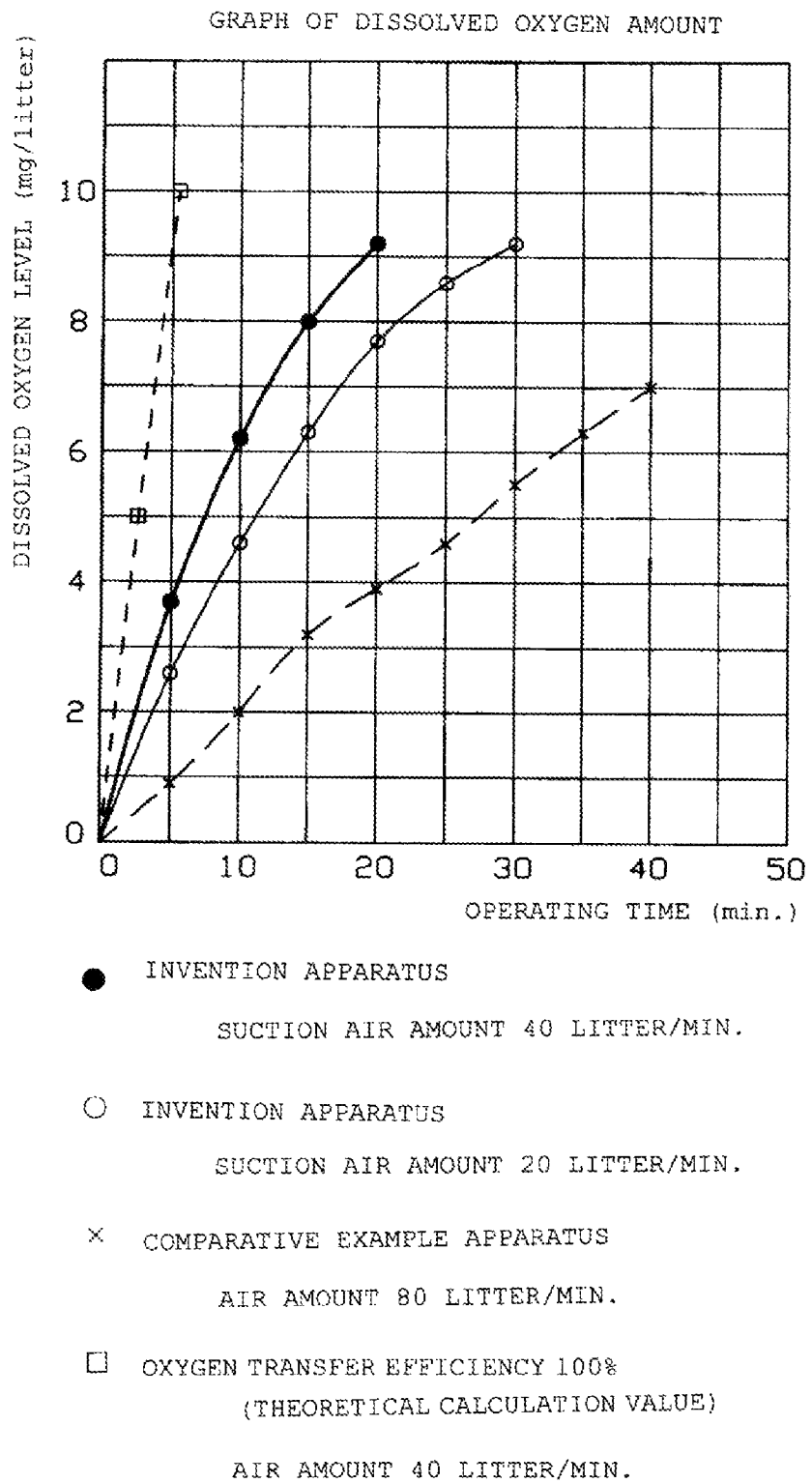
FIG. 9 is a graph showing dissolved oxygen levels.
Figure 10:
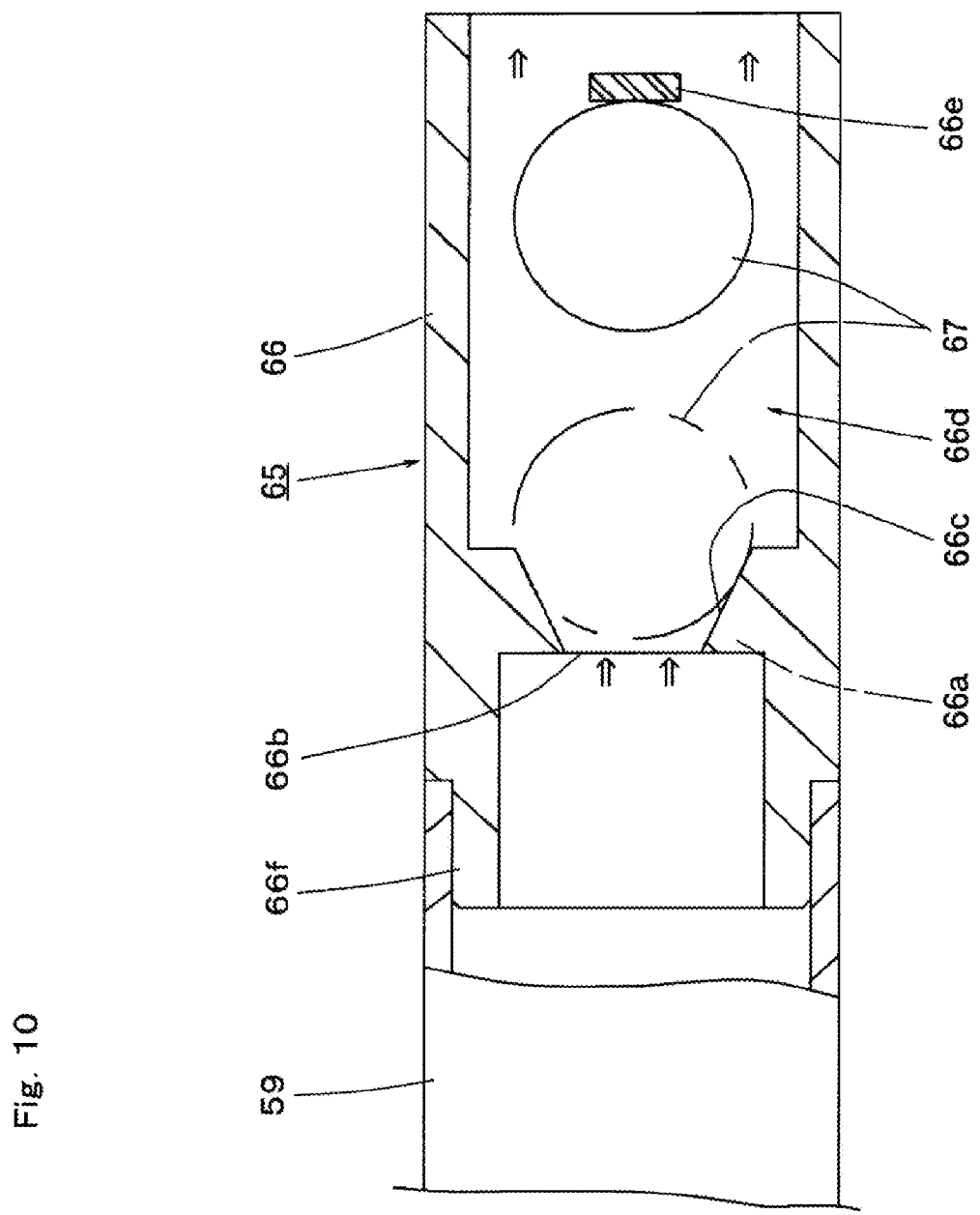
FIG. 10 is a diagram of a nozzle with a check valve.

Another experiment was conducted to compare the microscopic bubble generating apparatus in accordance with the invention with a comparison example of a conventional bubble generating apparatus using a Roots blower and a diffuser pipe with respect to a dissolved oxygen level in clear water with lapse of time. FIG. 9 shows the results of the experiment.

Experimental Methodology:
Anhydrous sodium sulfite powder was put into the septic tank so that the dissolved oxygen level was adjusted substantially to zero. Thereafter, the dissolved oxygen level of the water in the septic tank with lapse of time was measured by a dissolved oxygen meter (DO Meter ID-100) manufactured by Iijima Electronics Corporation, Japan. An amount of anhydrous sodium sulfite powder put into the septic tank ranged from 10 to 15 g per water of 100 liters.

Experimental Conditions:
Water tank volume: 2320 liters
Water temperature: 11° C.
Water depth: 1 m The microscopic bubble generating apparatus in accordance with the invention:
Diameter of Roots-type pump: 50 mm
Rotational speed: 630 to 720 rpm
Motor output power: 1.5 Kw
Discharge water amount: 200 liters/min
Suction air amount: 200 liters/min., 40 liters/min The microscopic bubble generating apparatus of comparison example:
Diameter of Roots-type pump: 20 mm
Rotational speed: 1000 rpm
Motor output power: 0.4 Kw
Suction water amount: 200 liters/min, 40 liters/min As the result of the experiment, the dissolved oxygen level reached 9.2 mg/litter after lapse of 20 minutes in the case of a suction air amount of 40 litter/min in the microscopic bubble generating apparatus in accordance with the invention. The dissolved oxygen level reached 7 mg/liter even after lapse of 40 minutes. Consequently, it was confirmed that the microscopic bubble generating apparatus in accordance with the invention could increase the dissolved oxygen level in the water in a shorter period of time than the apparatus of the comparison example.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A microscopic bubble generating apparatus which blows microscopic bubbles into water in a septic tank or river thereby to clean the water, the apparatus comprising:
   a Roots-type pump including a pump casing provided with a suction port and a discharge port, a pair of multi-lobed Roots rotors housed in the pump casing, and a drive motor which rotates the rotors;
   a suction pipe connected to the suction port of the pump casing;
   a discharge pipe connected to the discharge port of the pump casing; and
   a conduit which communicates with the suction pipe and is provided with an air inlet and a collision member with which sucked water is caused to collide,
   wherein the Roots-type pump is operated to suck water through the suction pipe and to cause the water mixed with air sucked through the air inlet to collide with the collision member so that a number of bubbles are generated;
   the bubbles are refined by a compressing action of the Roots-type pump thereby to be rendered microscopic; and
   the water containing the microscopic bubbles is released from the discharge pipe into the water in the septic tank or the river.

2. The apparatus according to claim 1, wherein the two Roots-type pumps are arranged in series when the bubbles are diffused into the water in a section of the river ranging from 100 to 200 meters, when the suction pipe at the suction side has a length ranging from 20 to 30 meters or a suction lift of the Roots-type pump ranges from 3 to 5 meters.

3. The apparatus according to claim 1, wherein the discharge pipe has a distal end provided with a nozzle with a check valve.

4. The apparatus according to claim 2, wherein the discharge pipe has a distal end provided with a nozzle with a check valve.

* * * * *